(12) United States Patent
Watanabe et al.

(10) Patent No.: US 7,210,825 B2
(45) Date of Patent: May 1, 2007

(54) LIGHT SOURCE DEVICE

(75) Inventors: Hiroshi Watanabe, Fujisawa (JP); Noboru Fujino, Iwai (JP); Syunsaku Satoh, Minoo (JP)

(73) Assignee: Victor Company of Japan, Ltd. (JP)

( * ) Notice: Subject to any disclaimer, the term of this patent is extended or adjusted under 35 U.S.C. 154(b) by 0 days.

(21) Appl. No.: 10/736,384

(22) Filed: Dec. 15, 2003

(65) Prior Publication Data

US 2004/0145896 A1    Jul. 29, 2004

(30) Foreign Application Priority Data

Dec. 16, 2002  (JP)  ............................. 2002-364088
Sep. 11, 2003  (JP)  ............................. 2003-320258

(51) Int. Cl.
*G03B 21/16* (2006.01)
(52) U.S. Cl. .................. 362/373; 362/294; 353/61; 353/119
(58) Field of Classification Search ............... 362/294, 362/373, 188, 264; 353/61, 52, 60, 119
See application file for complete search history.

(56) References Cited

U.S. PATENT DOCUMENTS

| | | | | |
|---|---|---|---|---|
| 6,402,346 | B1 * | 6/2002 | Liao et al. ................... | 362/294 |
| 6,435,699 | B2 * | 8/2002 | Glowach et al. ............ | 362/294 |
| 6,494,600 | B2 * | 12/2002 | Liang et al. ................. | 362/373 |
| 6,976,760 | B2 * | 12/2005 | Ito et al. ....................... | 353/61 |

FOREIGN PATENT DOCUMENTS

| | | |
|---|---|---|
| JP | 2001-125195 | 5/2001 |
| JP | 2002-049098 | 2/2002 |
| JP | 2002-139511 | 5/2002 |
| JP | 2002-328426 | 11/2002 |

* cited by examiner

*Primary Examiner*—Sandra O'Shea
*Assistant Examiner*—Anabel Ton
(74) *Attorney, Agent, or Firm*—Renner, Kenner, Greive, Bobak, Taylor & Weber

(57) ABSTRACT

A light source device equipped with a concave reflector having an open front end section. Installed in the light source device is a light source having a light emitting unit. The unit is positioned on a focal point of the reflector. A cover is attached to the open front end section of the reflector to cover the open front end section. The cover has an air inflow opening provided at a side section thereof in relation to the open front end section. At least a part of the cover is made of a transparent material. The part is a light passage through which light emitted by the light source and reflected by the reflector passes. The light source device is further equipped with a fan having an air outflow opening. The fan is provided so that airflow created by the fan and blown through the air outflow opening is directed to the air inflow opening of the cover, without obstructing the light passing through the light passage. An air control unit is provided between the air outflow opening of the fan and the air outflow opening of the cover. The air control unit controls the airflow blown through the air outflow opening of the fan so that it is flown into the reflector through the air inflow opening of the cover and directed at least to one specific section of the light source, thus cooling the specific section.

11 Claims, 19 Drawing Sheets

LIGHT SOURCE DEVICE

BACKGROUND OF THE INVENTION

The present invention relates to a light source device for use in, for example, image display apparatus. Particularly, this invention relates to effective cooling of a discharge-lamp light source installed in such a light source device.

Liquid crystal projectors have been introduced as one type of image display apparatus. This type of image display apparatus requires a light source for illuminating a liquid crystal panel (spatial light modulator) that does not emit light. In other words, in this type of image display apparatus, light emitted from a light source device is illuminated onto a liquid crystal panel and modulated thereon. The modulated light is then projected onto a screen to display images thereon.

A light source device for use in this type of image display apparatus has a discharge-lamp light source, such as, a high-pressure mercury lamp, a metal halide lamp or a xenon lamp. It is further equipped with an elliptical reflecting mirror for converging rays of light emitted from the discharge-lamp light source or a parabolic reflecting mirror for reflecting rays of light emitted from the discharge-lamp light source into a parallel beam.

A recent demand for this type of image display apparatus is high intensity of images displayed. High-intensity images require large light output from a discharge-lamp light source. This leads to enhancement of light power for discharge-lamp light sources. For this reason, a fundamental factor in this type of image display apparatus is cooling capacity, the capacity of cooling a discharge-lamp light source.

Higher-intensity images in this type of image display apparatus require lower clearance, one of the specifications for discharge-lamp light sources. This further requires different levels of cooling capacity in accordance with sections of a discharge-lamp light source.

One known type of light source device has an axial-flow fan that guides ambient air to a discharge-lamp light source and cools it with this air. An axial-flow fan is a propeller fan that blows air in the direction parallel to the rotary axis of the fan.

Another recent known type of light source device has a sirocco fan for cooling. A sirocco fan has a multi-blade cylinder that rotates to create airflow in the centrifugal direction from the rotary shaft and a scroll casing that takes the airflow and blows it through an air outflow opening.

A sirocco fan achieves high pressure with effective use of centrifugal force and optimum high static pressure to create a relatively large amount of airflow. It is suitable for local cooling thanks to its airflow directional characteristics and high static pressure.

A light source device is disclosed in Japanese Unexamined Patent Publication No. 2001-125195. In this device, airflow created by a cooling fan is blown into a concave reflector through an air duct. This light source device, however, has an inferior structure with a wide gap (high clearance) between a sirocco fan and a discharge-lamp light source to be cooled by the sirocco fan.

In another light source device disclosed in Japanese Unexamined Patent Publication No. 2002-49098, airflow created by a sirocco fan is blown around a reflector about 1/2 times before guided into the reflector.

In contrast, airflow is blown onto the outer surface of a reflector in still another light source device disclosed in Japanese Unexamined Patent Publication No. 2002-328426.

Due to these inferior structures, the known light source devices are not feasible for cooling a discharge-lamp light source.

In addition, cooling temperatures are the fundamental factors on operating properties in light source devices. In detail, a discharge unit of a discharge-lamp light source requires to be maintained at a relatively high temperature with no excess cooling whereas sealed sections of its both ends require heavy cooling due to, for example, glass-metal junction for the sealed sections.

Moreover, light source devices require precise control of temperature difference inevitably caused by convective airflow within an appropriate range between the upper and lower sections of a discharge unit, for stable operation.

Nevertheless, the known light source devices having the inferior structures discussed above cannot achieve such delicate control.

SUMMARY OF THE INVENTION

A purpose of the present invention is to provide a light source device that achieves effective cooling capability and also efficient cooling controllability by using a fan such as a sirocco fan in accordance with sections of, for example, a discharge-lamp light source.

A light source device according to the present invention is equipped with a concave reflector having an open front end section. Installed in the light source device is a light source having a light emitting unit. The unit is positioned on a focal point of the reflector.

A cover is attached to the open front end section of the reflector to cover the end section. The cover has an air inflow opening provided at a side section thereof in relation to the open front end section. At least a part of the cover is made of a transparent material. The part is a light passage through which light emitted by the light source and reflected by the reflector passes.

The light source device is further equipped with a fan having an air outflow opening. The fan is provided so that airflow created by the fan and blown through the air outflow opening is directed to the air inflow opening of the cover, without obstructing the light passing through the light passage.

An air control unit is provided between the air outflow opening of the fan and the air inflow opening of the cover. The air control unit controls the airflow blown through the air outflow opening of the fan so that it is flown into the reflector through the air inflow opening of the cover and directed at least to one specific section of the light source, thus cooling the specific section.

BRIEF DESCRIPTION OF DRAWINGS

FIG. 11 is a side view of a second modification to the air control unit shown in FIG. 7;

DETAILED DESCRIPTION OF PREFERRED EMBODIMENT

A preferred embodiment according to the present invention will be disclosed with reference to the attached drawings.

Figure 1:
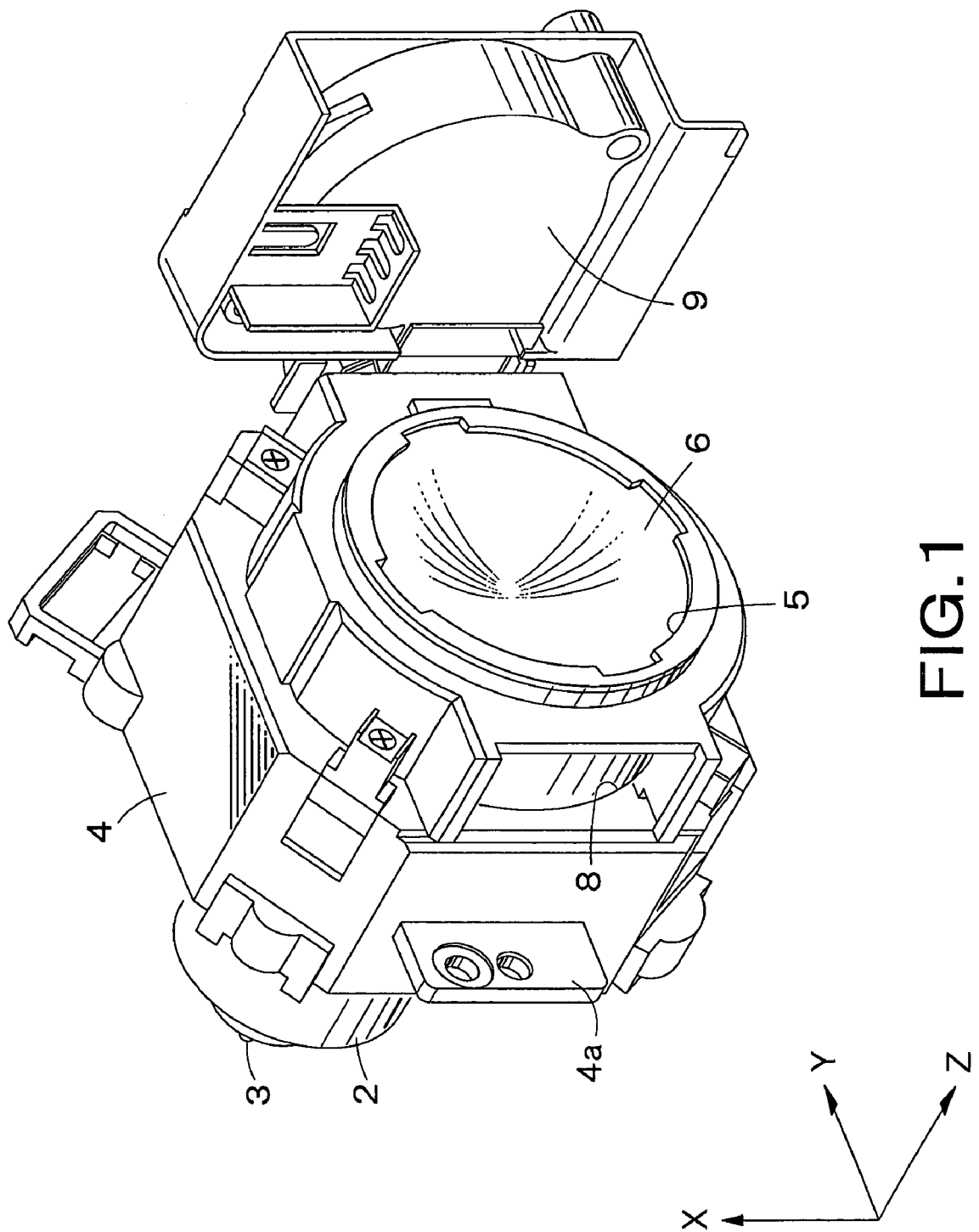
FIG. 1 is a perspective view illustrating the front appearance of a light source device, a preferred embodiment according to the present invention.
Figure 2:
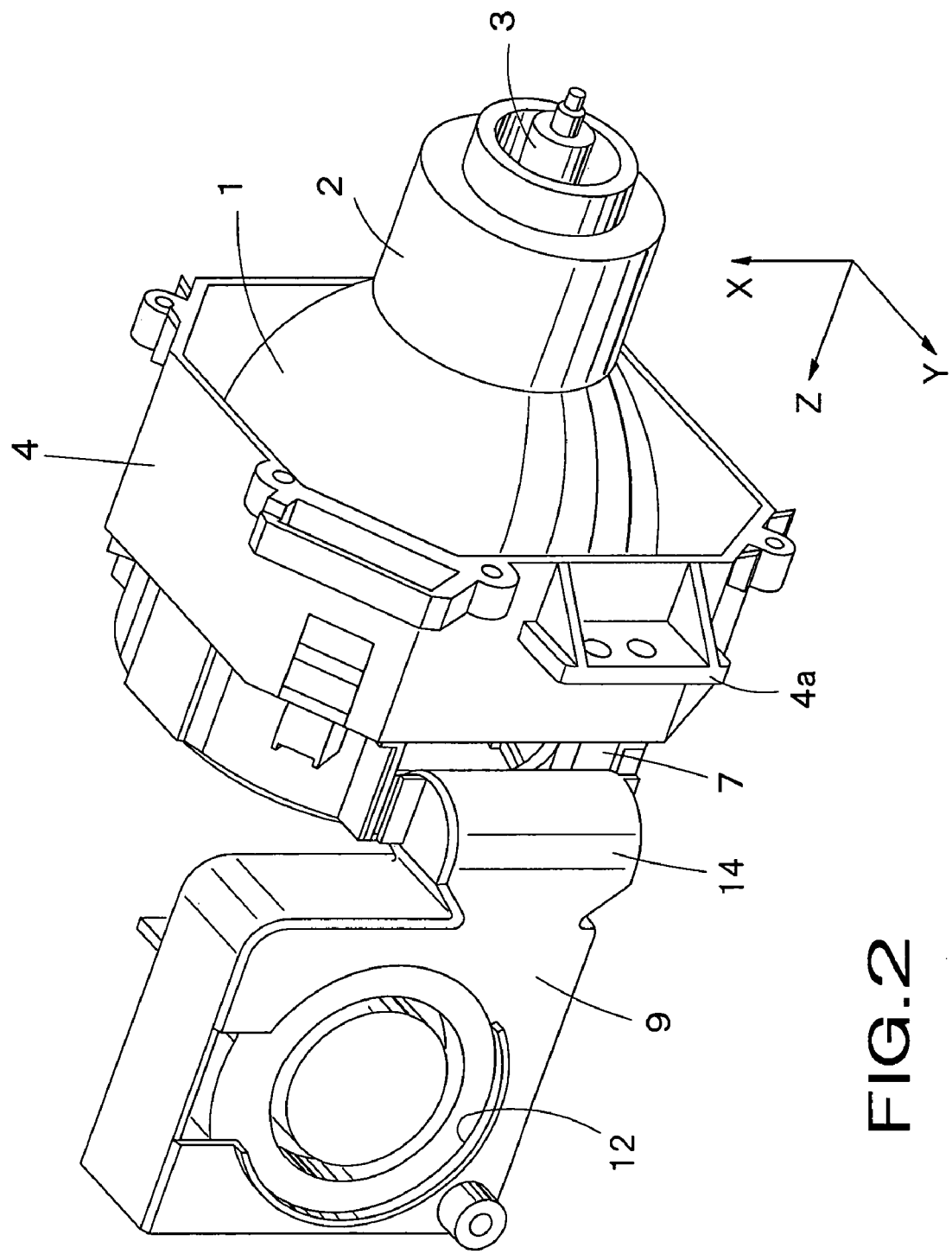
FIG. 2 is a perspective view illustrating the rear appearance of the light source device shown in FIG. 1.
Figure 3:
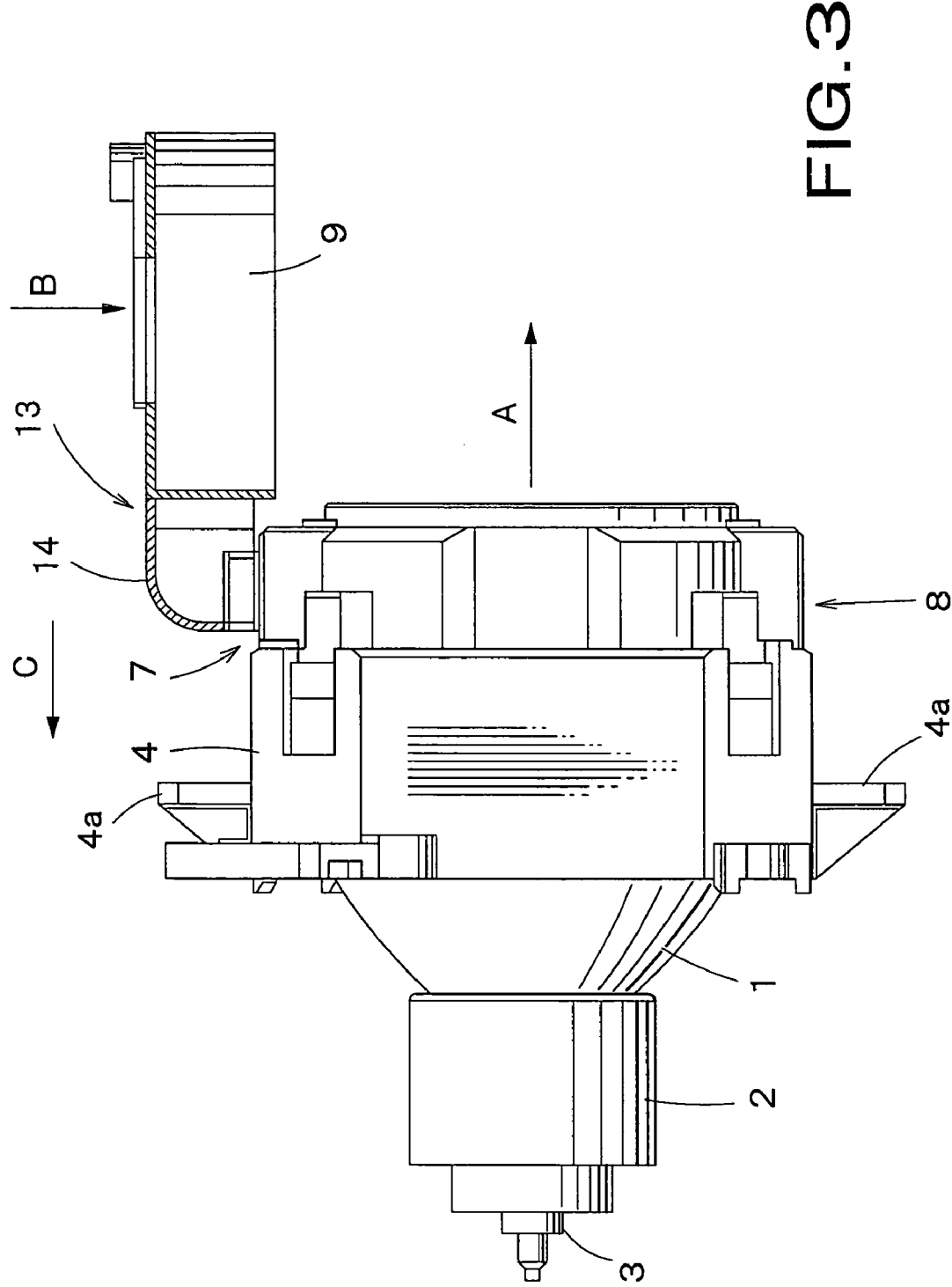
FIG. 3 is a top view illustrating the top appearance of the light source device shown in FIG. 1.

FIGS. 1 and 2 are perspective views and FIG. 3 is a plan view, illustrating the appearance, from different angles, of a light source device, a preferred embodiment according to the present invention.

As shown in FIG. 2, the light source device is equipped with a reflector 1 having a front concave open end. The reflector 1 is a spheroidal ellipsoid mirror, which may, however, be a paraboloid mirror.

Figure 4:
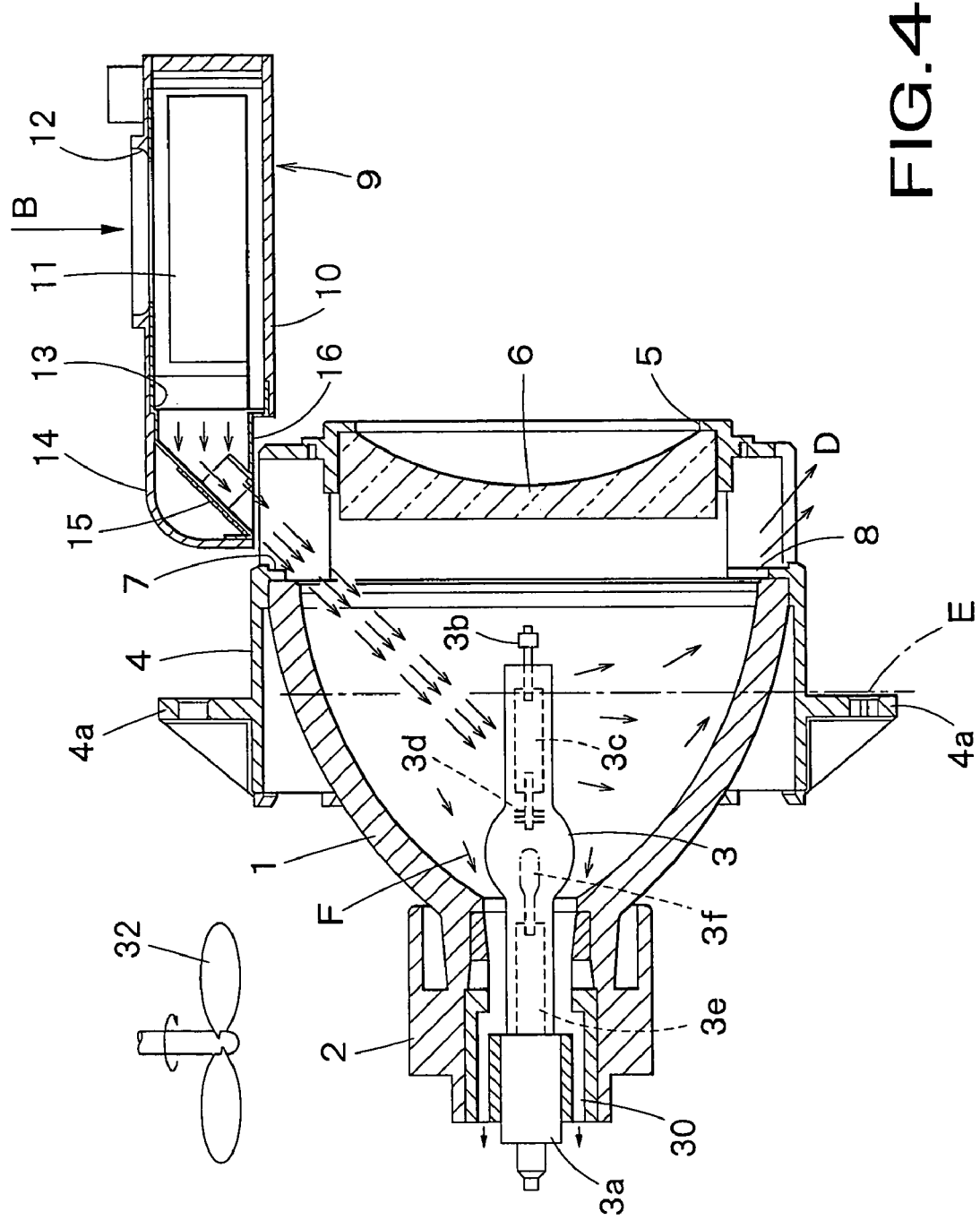
FIG. 4 is a cross sectional view of the light source device shown in FIG. 1.

FIG. 4 shows a cross section of the light source device having a discharge-lamp light source 3 shown in FIG. 3, on the horizontal plane including an optical axis passing the center of the light source 3.

The discharge-lamp light source 3 is provided in the reflector 1 so that a light-emitting unit of the light source 3 is situated on a first focal point in the reflector 1, as shown in FIG. 4. It is a discharge lamp having caps on both ends, such as, a metal halide lamp, a high-pressure mercury lamp, or a xenon lamp.

In detail, the discharge-lamp light source 3 is equipped with a cylindrical glass tube having a semi-spherical valve (light-emitting unit). The glass tube is a sealed tube filled with mercury for a high-pressure mercury lamp, iodide or haloid gas in addition to mercury for a metal halide lamp, or xenon gas for a xenon lamp.

The both ends of the glass tube are electrode sealing sections having a cap 3a and a lead wire 3b, respectively. The lead wire 3b is inserted into the glass tube and connected to a cathode 3d via a molybdenum foil 3c. The cap 3a is connected to an anode 3f via another molybdenum foil 3e. The cathode 3d and the anode 3f face each other from both ends of the light-emitting section, for discharging therebetween in light emission.

The discharge-lamp light source 3 is secured in the reflector 1 as the cap 3a is supported by a socket 2 of the reflector 1 while the lead wire 3b is inserted into a rear open end of the reflector 1, with the light-emitting unit situated on the first focal point.

The rear open end of the reflector 1 is a rear air outflow opening 30 through which part of cooing air is discharged outside, as discussed later. Provided over the socket 2 is an axial-flow fan 32 for blowing air to the socket 2 to discharge outside the cooling air blown through the rear air outflow opening 30.

The reflector 1 having the discharge-lamp light source 3 secured therein is housed in a lamp box 4. In other words, the lamp box 4 is a cover of the reflector 1. The lamp box 4 is attached to the front open end of the reflector 1 to cover the open end. It is installed in, for example, an image display apparatus.

The lamp box 4 has an opening 5 in an optical passage through which a light beam emitted by the discharge-lamp light source 3 and reflected by the reflector 1 passes. Situated in the opening 5 is a collimator lens 6, a concave lens made of a transparent material. The collimator lens 6 converts rays of light reflected by the reflector 1 (the spheroidal ellipsoid mirror) into parallel rays that are directed to a second focal point of the reflector 1.

A transparent parallel flat plate is situated in the opening 5, instead of the collimator lens 6, if the reflector 1 is a paraboloid mirror.

Figure 5:
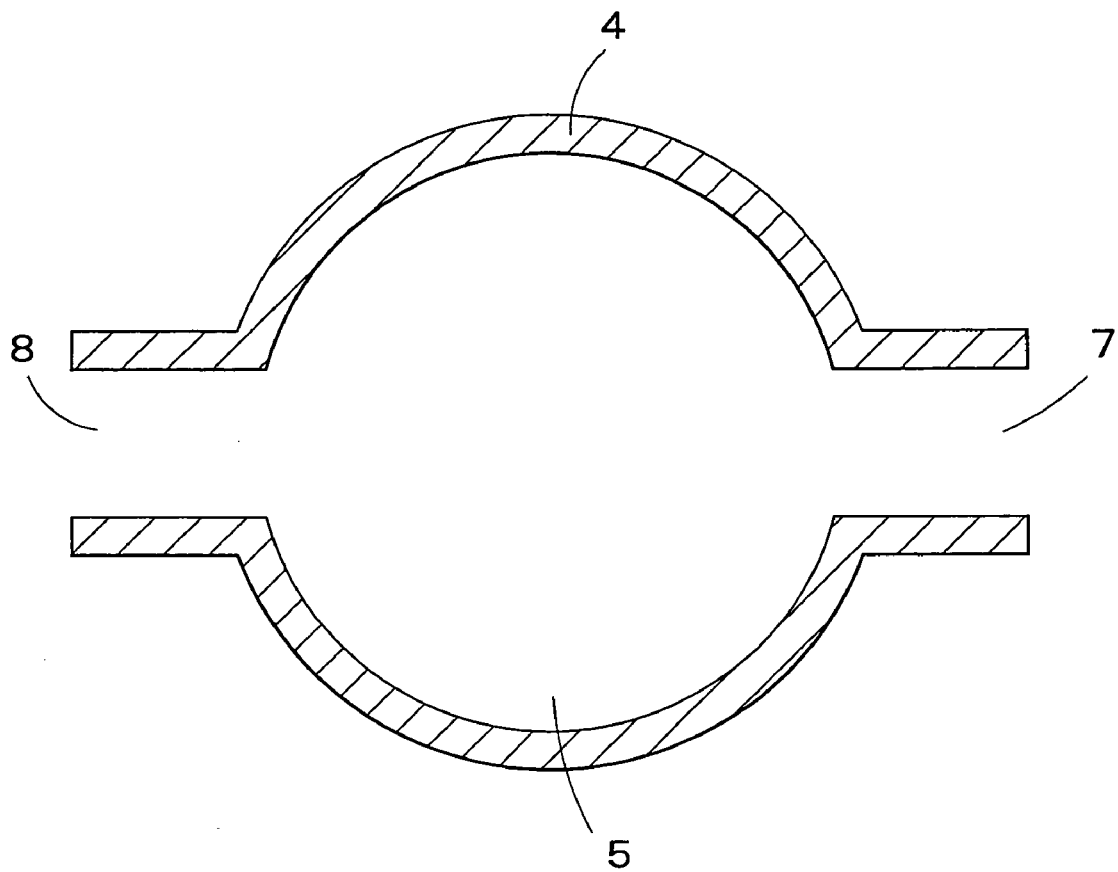
FIG. 5 is a cross sectional view of a lamp box at the front side sections, installed in the light source device shown in FIG. 1.

FIG. 5 shows a longitudinal section of the front side section of the lamp socket 4 in the longitudinal direction orthogonal to the optical axis of a bundle of rays of light reflected by the reflector 1.

The lamp socket 4 is provided with two rectangular openings 7 and 8 at the front side section, as shown in FIG. 5, or its side sections between the collimator lens 6 and the reflector 1.

The openings 7 and 8 are air inflow and outflow openings, respectively. Airflow created by a sirocco fan (disclosed later) is blown into the reflector 1 through the air inflow opening 7. Air, 60% to 80% of the airflow blown into the reflector 1 is discharged from the air outflow opening 8 while the rest of the airflow is discharged from the rear air outflow opening 30.

The light source device is equipped with a sirocco fan (a cross-flow fan) 9, as shown in FIGS. 1 and 3, which may however be an axial-flow fan. The sirocco fan 9 is situated in front of the air inflow opening 7 of the lamp box 4, so as not to obstruct a bundle of rays of light depicted by an arrow A in FIG. 3, which is emitted by the discharge light source 3 and then reflected by the reflector 1.

As shown in FIG. 4, the sirocco fan 9 is equipped with a fin 11 rotatable in a casing 10 and having a plurality of radial blades. The fin 11 is rotated by a motor (not shown) so that airflow created between adjacent blades is blown around the casing 10 due to centrifugal force. The airflow is further blown outside of the casing 10 through an air outflow opening 13 provided on the side section of the casing 10 while airflow is flown into the casing 10 through an air inflow opening 12 provided at the center section of the fin 11, as depicted by an arrow B in FIG. 4.

Figure 6:
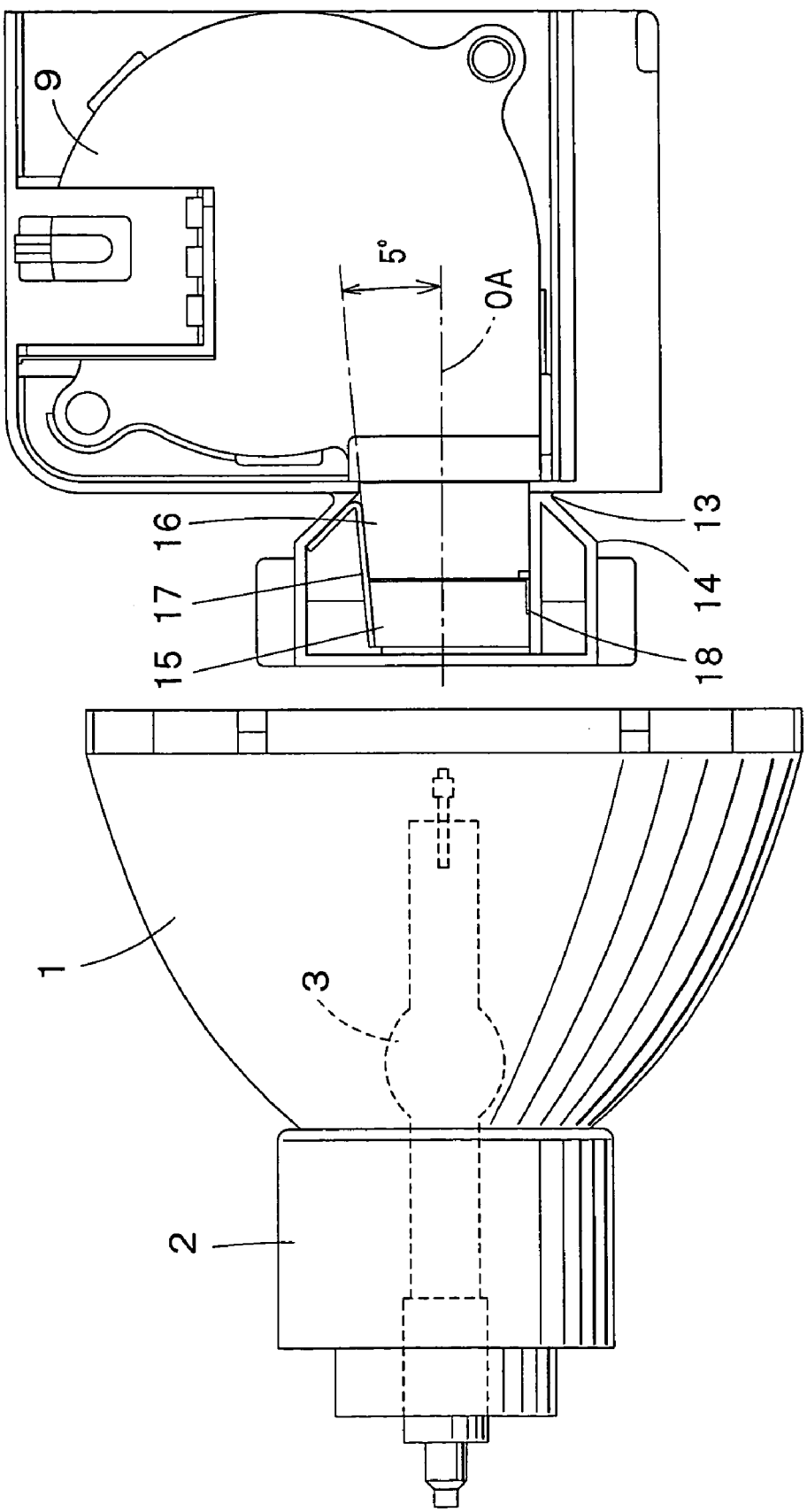
FIG. 6 is a side view illustrating a positional relationship between a reflector and a sirocco fan, both installed in the light source device shown in FIG. 1.

FIG. 6 shows a side view illustrating a positional relationship between the reflector 1 and the sirocco fan 9.

The sirocco fan 9 is provided so that airflow blown through the air outflow opening 13 is directed to the air inflow opening 7 of the lamp box 4. It is further provided so that the center of the air outflow opening 13 and the optical-axis center of the reflector 1 have the same height, the same coordinate on the axis of ordinate X shown in FIGS. 1 and 2.

In other words, the sirocco fan 9 is provided on one side of the light source device, in front of the front end section of the reflector 1 so that this front end section faces the air outflow opening 13 of the sirocco fan 9.

This arrangement allows the direction of a bundle of rays of light reflected by the reflector 1 and emitted from the lamp box 4, depicted by the arrow A in FIG. 3, and another direction of air outflow from the sirocco fan 9, depicted by an arrow C in FIG. 3, to be parallel and opposite to each other.

Nevertheless, the sirocco fan 9 may not always be provided so that its longitudinal direction is parallel to the direction of a bundle of rays of light reflected by the reflector 1 and emitted from the lamp box 4, as depicted by the arrow A.

The maximum distance between the air inflow opening 7 of the lamp box 4 and the air outflow opening 13 of the sirocco fan 9 in the direction of airflow is almost equal to the diameter of the opening 13 in the thickness direction of the fan 9. The former distance may be larger than the latter diameter but preferably smaller than 3 times the latter.

The air inflow opening 7 of the lamp box 4 and the air outflow opening 13 of the sirocco fan 9 are connected to each other by a duct 14, an air guide member. Air blown by the sirocco fan 9 is flown into the reflector 1 through the duct 14 at a minimum distance.

In detail, as shown in FIG. 4, air blown by the sirocco fan 9 through the air outflow opening 13 is flown into the reflector 1 through the duct 14 and then the air inflow opening 7 of the lamp box 4 and intensively sprayed on the discharge lamp light source 3, thus cooling the light source 3.

Most of the cooling air is discharged outside of the lamp box 4, as depicted by an arrow D in FIG. 4, through the air outflow opening 8 provided as opposite to the air inflow opening 7. The rest of the air is discharged outside of the lamp box 4, as depicted by an arrow F in FIG. 4, through the rear air outflow opening 30 while cooling the anode sealing section of the discharge lamp light source 3.

The sirocco fan 9 can be made compact in this light source device because of short distance between the fan 9 and the discharge lamp light source 3 as discussed above and also low impedance of the air passage. The impedance of air passage indicates the resistance against airflow as a fan pushes air through an air passage, the larger the cross section of air passage, the lower the impedance, whereas the longer the air passage, the higher the impedance. This invention offers short air passage, thus achieving low impedance of the air passage.

The sirocco fan 9 is not an axial-flow fan, so that it can converge air and blow the air at a speed of, for example, 2 m/sec.

Figure 7:
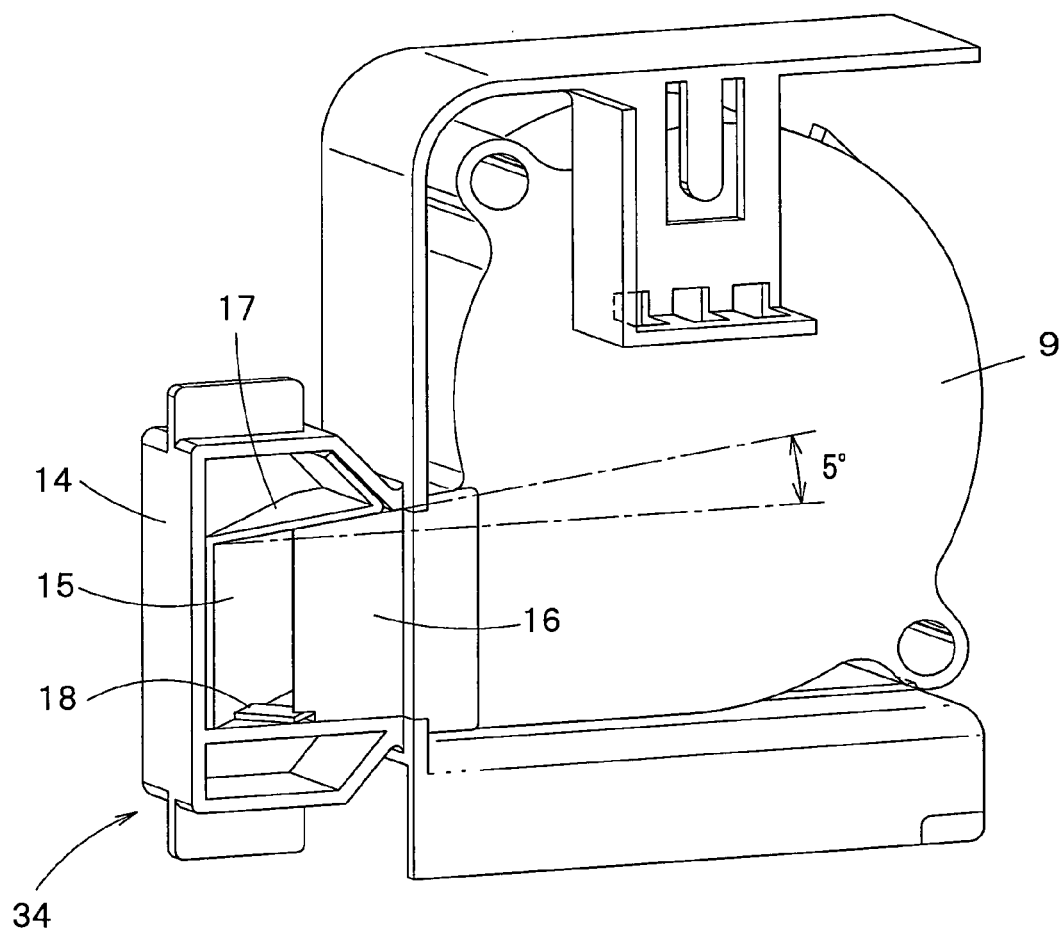
FIG. 7 is a perspective view of the sirocco fan shown in FIG. 6, equipped with an air control unit.

In a perspective view, shown in FIG. 7, the sirocco fan 9 is equipped with an air control unit 34 constituted by first to fourth partitions 15, 16, 17 and 18. The sirocco fan 9 is situated so that the air control unit 34 almost touches the reflector 1.

Air blown by the sirocco fan 9 is controlled by the air control unit 34 for its flow with almost no change in direction and also almost no losses. The controlled air is intensively sprayed on a specific position of the discharge lamp light source 3 in the reflector 1, in the vicinity of the molybdenum foil 3c of the light source 3, as shown in FIG. 4.

The discharge lamp light source 3 of this light source device requires precise control of cooling temperature and position. Specific shapes of the partitions 15, 16, 17 and 18 provide air blown by the sirocco fan 9 to a desired position or section, which will be discussed in detail later.

The discharge lamp light source 3 requires to be kept at a low temperature at its specific section in which the molybdenum foil 3c is installed. It is thus required to blow air to the specific section in which the molybdenum foil 3c is installed.

Nevertheless, the semi-spherical valve (light-emitting unit) of the discharge lamp light source 3 is required to be kept at a relatively high temperature for optimum light emission.

In contrast, the bar-like both end (sealing) sections, one of them housing the anode 3f and the other the cathode 3d, of the discharge lamp light source 3 are required to be intensively cooled for the sealed electrodes. Particularly, the cathode 3d in the front end section of the light source 3 is required to be cooled efficiently while the anode 3f in the rear end section is cooled via the reflector 1.

Precise airflow-direction control to the discharge lamp light source 3 in cooling is necessitated by a further lower clearance of the light source due to recent demands for higher optical power and further compactness in projectors, which requires further precise temperature control in each section of the light source.

In the air control unit 34, shown in FIGS. 4, 6 and 7, in this embodiment, the first and second partitions 15 and 16 serve to control airflow in the Z-Y plane whereas the third and fourth partitions 17 and 18 in the direction X (FIGS. 1 and 2).

As disclosed, the sirocco fan 9 has the mechanism in which airflow created by a rotating cylinder (fin 11) having multiple blades is blown in the centrifugal direction from the motor shaft in the casing 10.

Airflow blown from the casing 10 through the air outflow opening 13 carries tangential-line components of swirling air, many of the components being flown upwards a little from the horizontal plane. The third partition 17 is thus adjusted so that air is blown downwards by, for example, about 5 degrees from the optical axis OA, as shown in FIG. 6.

Figure 8:
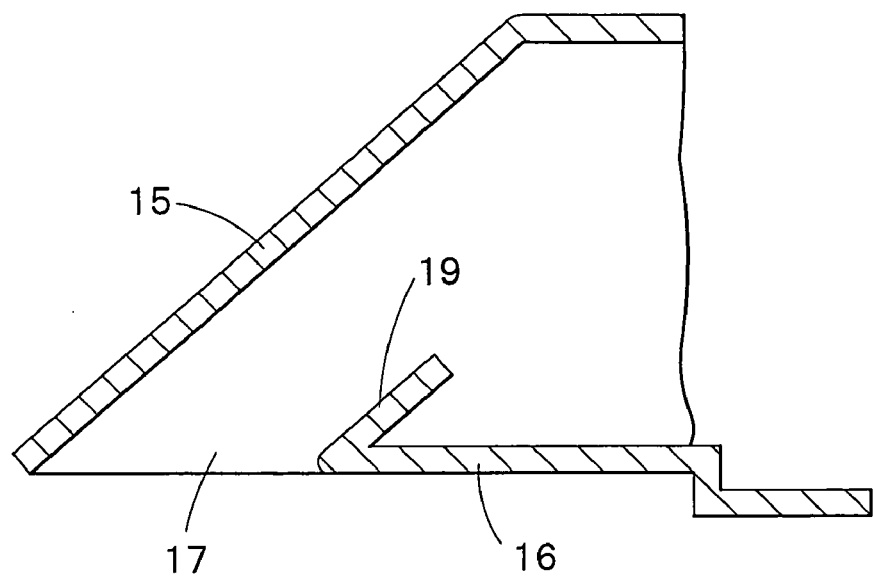
FIG. 8 is a cross sectional view illustrating an air outflow opening of the sirocco fan.

FIG. 8 is a cross sectional view illustrating the first and second partitions 15 and 16 in this embodiment.

As shown in FIG. 8, a front end 19 of the second partition 16 is folded into the air control unit 34, as almost parallel to the first partition 15. The airflow direction is controlled in the Z-Y plane (FIGS. 1 and 2) while it is flown between the first partition 15 and the folded front end section 19.

In this mechanism disclosed above, as shown in FIG. 4, cooling air blown through the air inflow opening 7 intensively hits and cools the front-end sealing section (cathode) of the discharge lamp light source 3.

The cooling air then hits and swirls along the inner surface of the reflector 1. Most of the cooling air is flown outside through the front air outflow opening 8 while the rest of the cooling air is flown outside through the rear air outflow opening 30 while cooling the rear-end electrode sealing section (anode) of the discharge lamp light source 3.

The electrode sealing sections of the discharge lamp light source 3 on both ends are therefore cooled sufficiently whereas the center semi-spherical valve (light-emitting unit) is cooled by cooling air spread over the valve and also cooling air swirling around the valve, both weaker than the cooling air for the sealing sections.

Figure 10:
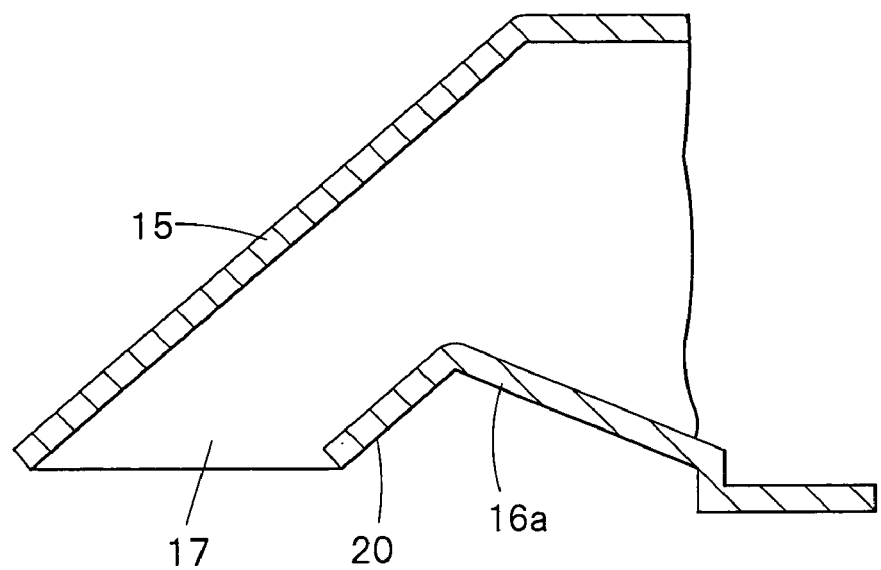
FIG. 10 is a cross sectional view illustrating an air outflow opening in the first modification.
Figure 9:
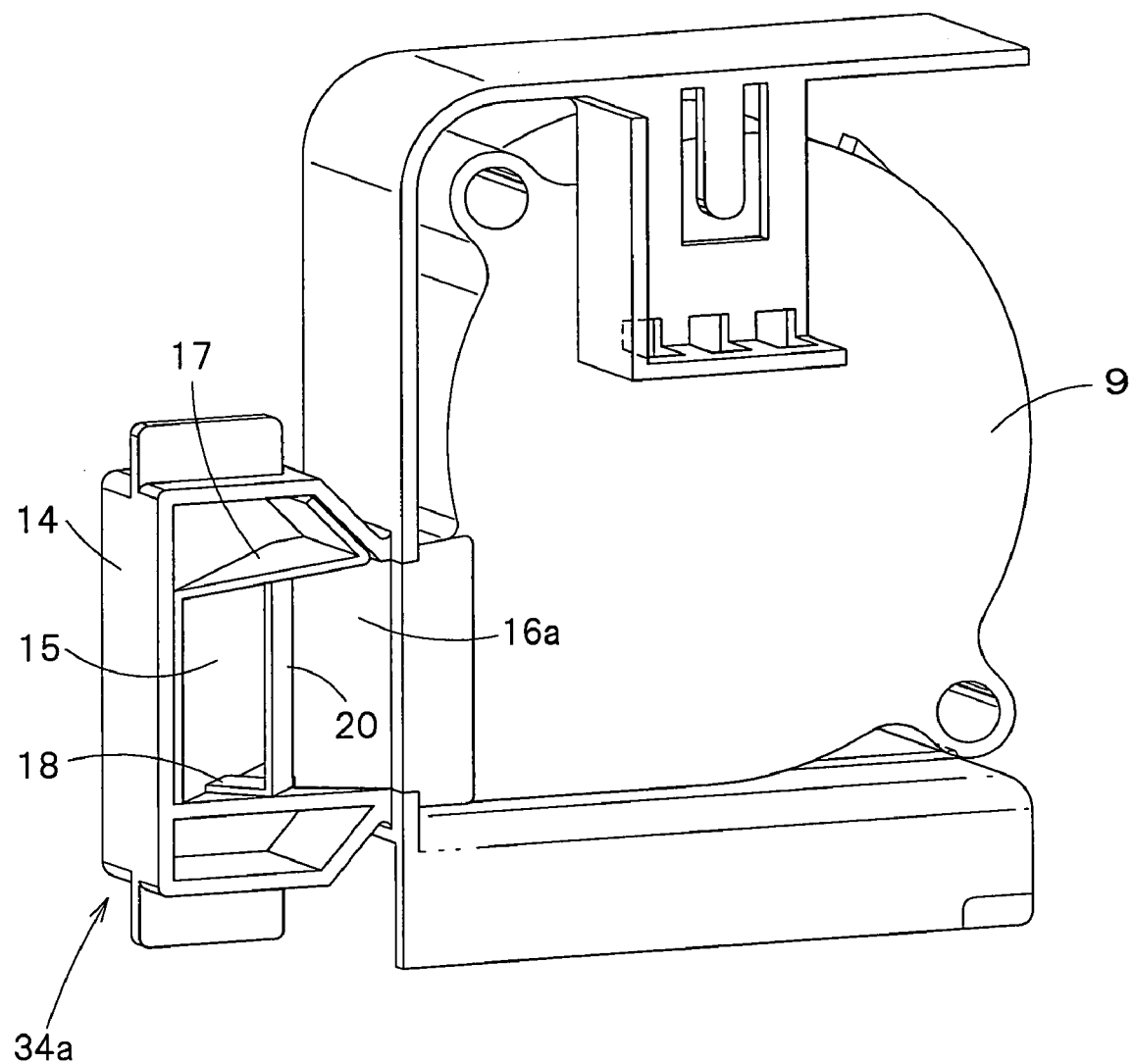
FIG. 9 is a perspective view of a first modification to the air control unit shown in FIG. 7.
Figure 1:
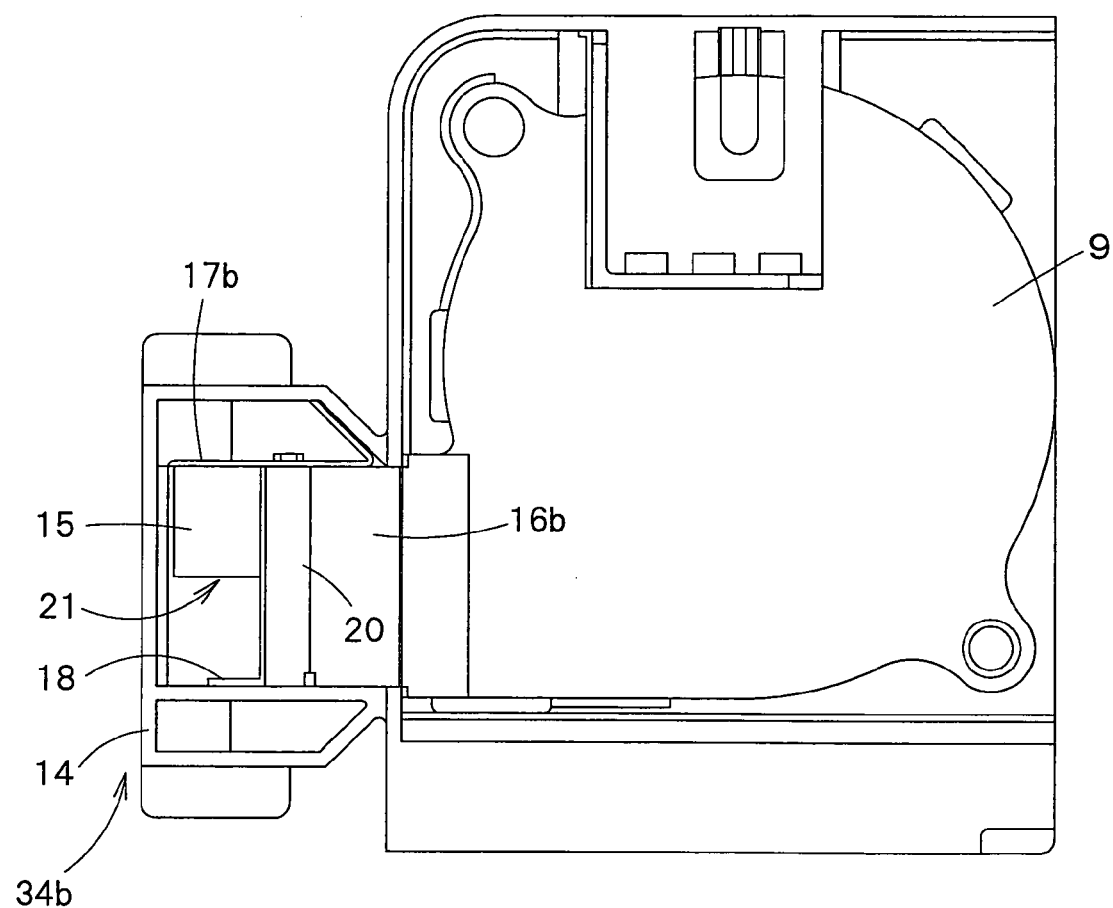

Illustrated in FIGS. 9 and 10 is an air control unit 34a, a first modification to the air control unit 34.

Elements shown in FIGS. 9 and 10 that are the same as or analogous to the elements shown in FIG. 7 are referenced by the same reference numbers.

In this modification, a second partition 16a is formed as curved inwardly, as shown in FIG. 10 (cross section). The second partition 16a is adjusted so that its front end 20 is almost parallel to the first partition 15.

The airflow direction is controlled in the Z-Y plane (FIGS. 1 and 2) while it is flown between the first partition 15 and the front end section 20.

The following arrangements made to the air control unit 34 shown in FIGS. 4, 6 and 7 are also applied to this modification.

The third and fourth partitions 17 and 18 serve to control air in the direction X (FIGS. 1 and 2). And, the third partition 17 is adjusted so that air is blown downwards by, for example, about 5 degrees from the optical axis OA, as shown in FIG. 6.

Figure 12:
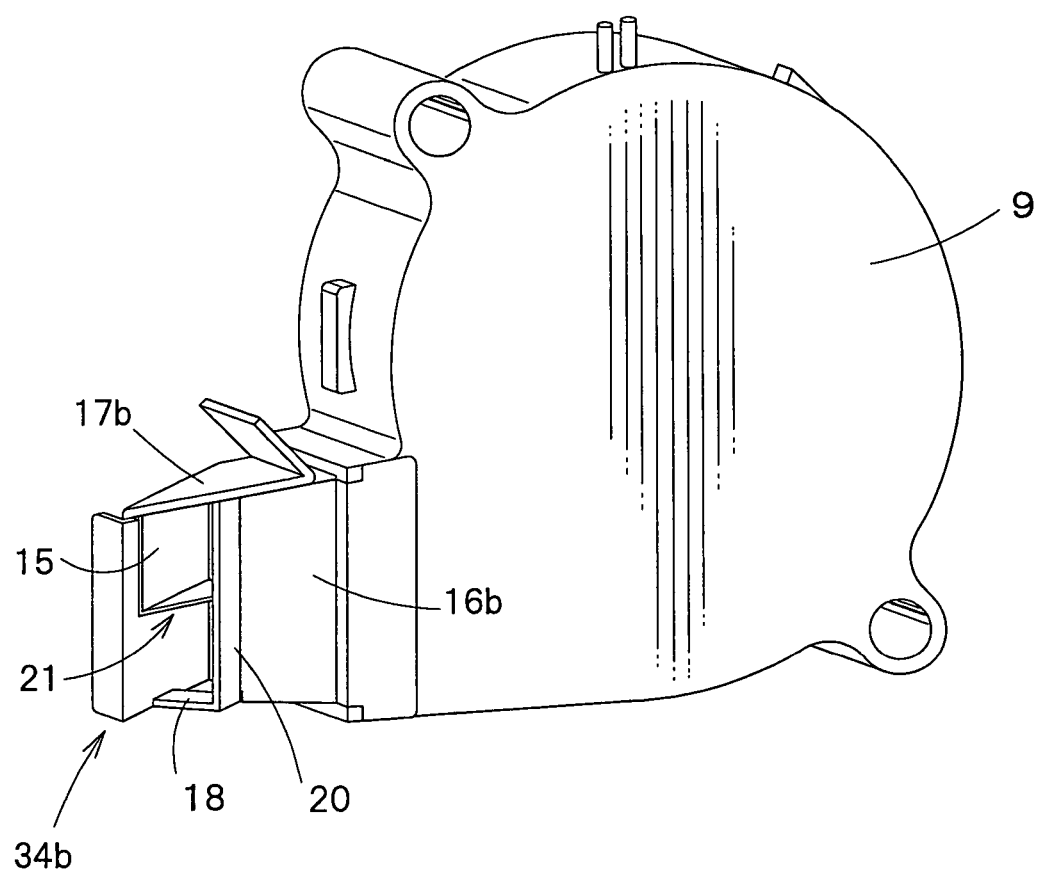
FIG. 12 is a perspective view of the sirocco fan equipped with the second modification to the air control unit.

Illustrated in FIGS. 11 and 12 is an air control unit 34b, a second modification to the air control unit 34.

Elements shown in FIGS. 11 and 12 that are the same as or analogous to the elements shown in FIG. 7 are referenced by the same reference numbers.

In this modification, a second partition 16b is formed into the same shape as the counterpart 16a shown in FIGS. 9 and 10. The second partition 16b is, however, equipped with a flow control plate 21 that separates the space into two vertically in the air control unit. The flow control plate 21 serves to control flow of tangential-line components of air that swirls due to rotation of the fin 11 of the sirocco fan 9. This allows a third partition 17b to be adjusted as parallel to the optical axis OA, different from the counterpart 17 (FIG. 6). To fulfill this function, the flow control plate 21 is provided so that a tangential line on an end of the plate 21 at the air inflow opening 7 side is directed to the specific section of the discharge lamp light source 3, in which the molybdenum foil 3c is installed.

Figure 13:
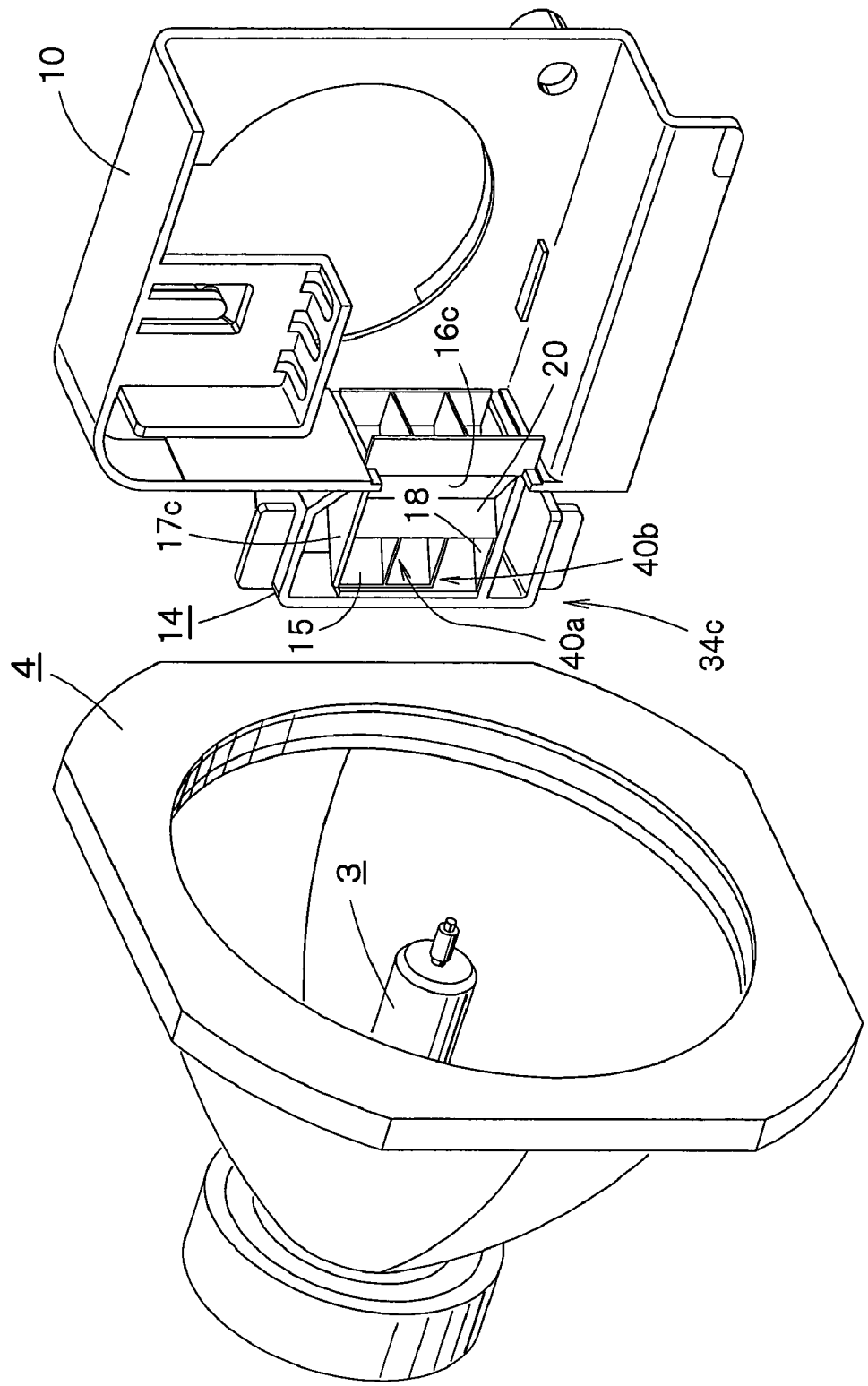
FIG. 13 is an exploded perspective view of the light source device according to the present invention equipped with a third modification to the air control unit.
Figure 14:
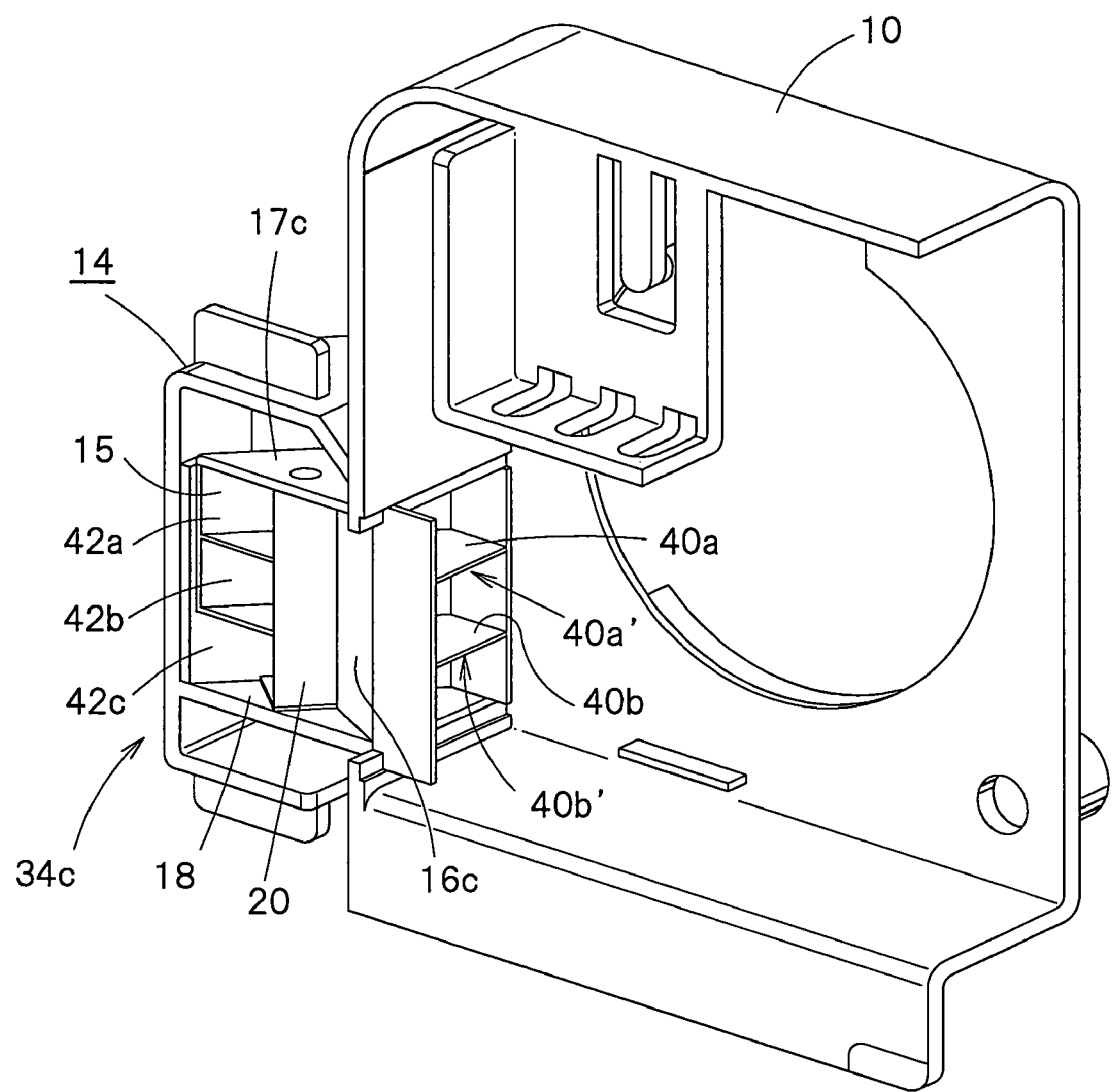
FIG. 14 is a perspective view illustrating an air outflow opening of the sirocco fan shown in FIG. 13.

Illustrated in FIGS. 13 and 14 is an air control unit 34c, a third modification to the air control unit 34.

Elements shown in FIGS. 13 and 14 that are the same as or analogous to the elements shown in FIG. 7 are referenced by the same reference numbers.

In this modification, a second partition 16c is formed into the same shape as the counterparts 16a and 16b in the first and second modifications, respectively, however, equipped with two flow control plates 40a and 40b arranged vertically. The flow control plates 40a and 40b are provided as extending in the horizontal direction (axis Z in FIGS. 1 and 2) and bridged over completely in the lateral direction (axis Y in FIGS. 1 and 2). They are situated vertically with a given gap to provide three air ducts 42a, 42b and 42c.

The flow control plates 40a and 40b have to meet several requirements on vertical location, length and position of their upstream-side ends to achieve appropriate distribution of airflow blown in the air ducts 42a, 42b and 42c.

In FIG. 14, an upstream-side end 40b' of the lower flow control plate 40b is formed as several millimeters longer than an upstream-side end 40a' of the upper flow control plate 40a to achieve appropriate distribution of airflow blown in the air ducts 42a, 42b and 42c.

Figure 16:
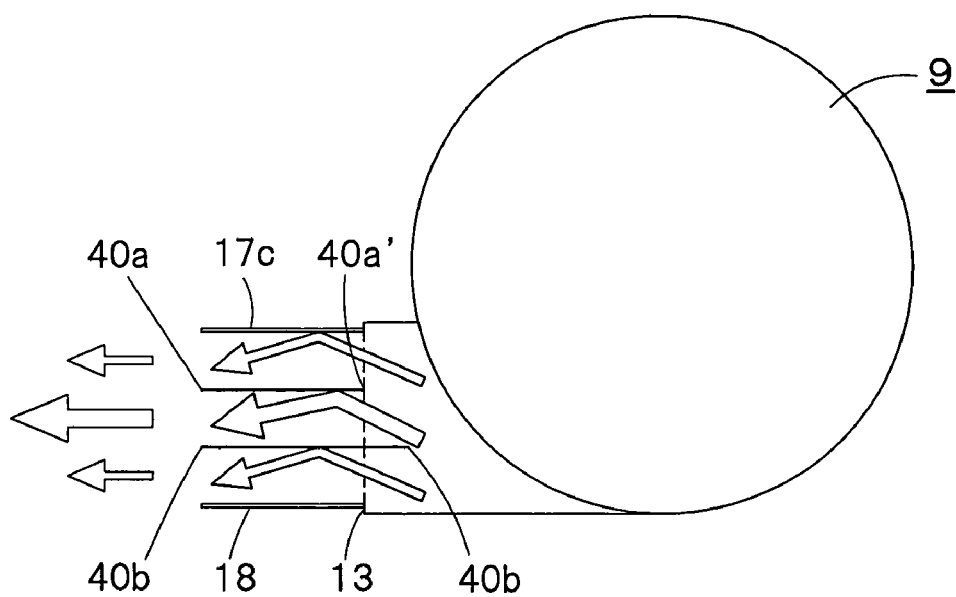
FIG. 16 is an illustration of simulation of airflow in the third modification.

A third partition 17c is adjusted as parallel to the optical axis OA, as illustrated in FIG. 16, like the counterpart 17b in the second modification.

Figure 15:
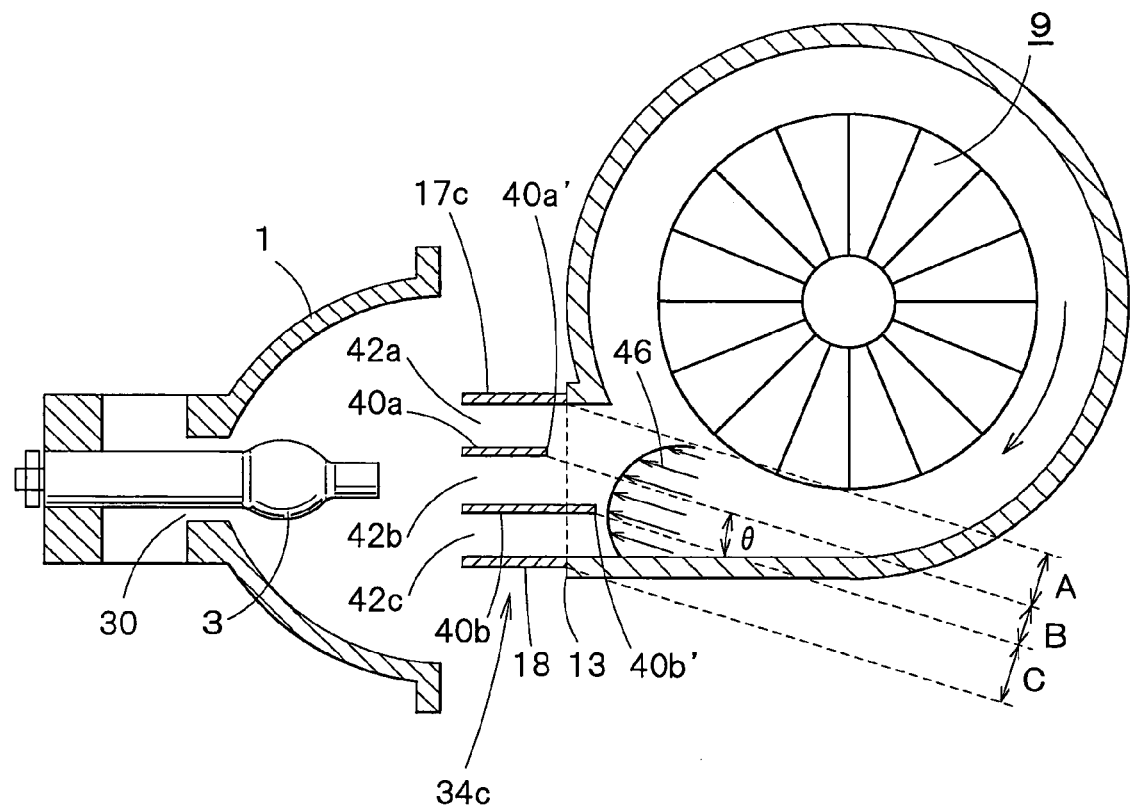
FIG. 15 is a cross sectional view illustrating the light source device equipped with the-third modification to the air control unit.

FIG. 15 is a cross sectional view illustrating the light source device equipped with the air control unit 34c (third modification).

As shown in FIG. 15, air blown by the sirocco fan 9 has an angle of elevation θ, such as 15 degrees, against the air outflow opening 13. The blowing air exhibits the distribution of airflow as depicted by arrows 46, the closer to the center of the airflow, the larger the distribution whereas the farther from the center of the airflow, the smaller the distribution.

The flow control plates 40a and 40b are arranged, as disclosed above, in the air control unit 34c that guides air blown through the air outflow opening 13 onto the discharge lamp light source 3.

In detail, the lower flow control plate 40b is made as longer than the upper flow control plate 40a, so that the upstream-side end 40b' of the lower plate 40b is little bit inserted into the air outflow opening 13. This arrangement increases the amount of air flown into the lowermost duct 42c, which could otherwise be decreased.

The adjustments to length of the flow control plates 40a and 40b, location of the upstream-side ends 40a' and 40b', etc., can vary the amounts of air flown into the ducts 42a, 42b and 42c.

Figure 17:
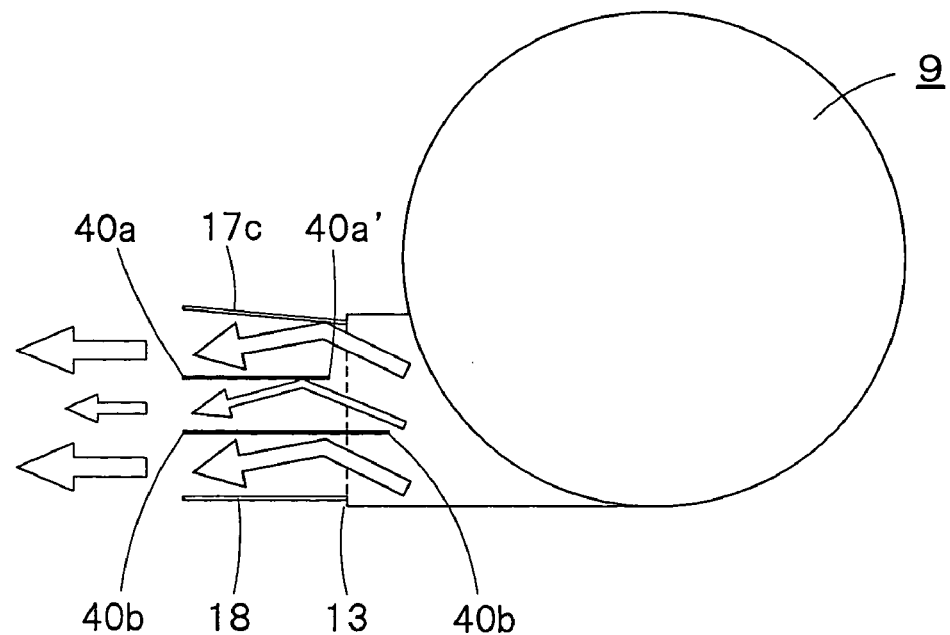
FIG. 17 is another illustration of simulation of airflow in the third modification.

Illustrated in FIGS. 16 and 17 are simulations of airflow in the third modification, the larger the size of arrows, the larger the amount of air.

In FIG. 16, the flow control plates 40a and 40b are arranged so that the upstream-side end 40a' of the upper flow control plate 40a is positioned at the end of the air outflow opening 13 whereas the upstream-side end 40b' of the lower flow control plate 40b is inserted into the opening 13 by about 2 mm, for example.

This arrangement gives air blown through the air outflow opening 13 an angle of elevation θ (FIG. 15) in the range from about 15 to 19 degrees.

The long upstream-side end 40b' of the lower flow control plate 40b gives larger amount of air flown into the middle duct 42b than the upper and lower ducts 42a and 42c.

On the contrary, in FIG. 17, the flow control plate 40a is provided so that its upstream-side end 40a' is positioned as having a gap with the end of the air outflow opening 13 by, for example, about 0.5 mm, whereas the upstream-side end 40b' of the flow control plate 40b being the same as shown in FIG. 16, with the third partition 17c a little bit inclined against the opening 13.

The short and long upstream-side ends 40a' and 40b' give smaller amount of air flown into the middle duct 42b than the upper and lower ducts 42a and 42c.

The positions of the flow control plates 40a and 40b may be varied vertically to change the size of the duct 42a, 42b and 42c.

As disclosed above in detail, the arrangements to the flow control plates 40a and 40b vary the distribution of air flown into the reflector 1 through the air inflow opening 7.

The distribution of air may be adjusted to give the amount of air: almost equal over the ducts 42a to 42c; equally larger for the upper and lower ducts 42a and 42c than for the middle duct 42b; the largest to the upper duct 42a; or the largest to the lower duct 42c.

The airflow control with the arrangements to the flow control plates 40a and 40b as discussed above gives optimum direction and wind velocity to cooling air that swirls when it hits the inner surface of the reflector 1.

The flow control plates 40a and 40b can be adjusted to have the height relationship among the ducts 42a to 42c, as the duct 42b higher than the duct 42c but lower than the duct 42a, as shown in FIG. 15. In addition, the flow control plates 40a and 40b can be adjusted for their lengths, for example, as shown in FIG. 15.

These height and length adjustments to the flow control plates 40a and 40b give a specific width ratio A:B:C among the ducts 42a, 42b and 42c in relation to the angle of elevation θ, as shown in FIG. 15.

This duct width relationship with the ratio A:B:C in relation to the angle of elevation θ gives the distribution of airflow or the amounts of air to the ducts 42a to 42c, as the largest for the duct 42c or the duct 42a whereas the smallest for the duct 42b.

The longer lower flow control plate 40b or the shorter upper flow control plate 40a provides stronger cooling air through the lower duct 42c than that through the upper duct 42a. The strong and weak cooling air collide with each other, flow along the inner surface of the reflector 1 and swirl around the semi-spherical valve. Most of the swirling air flow outside of the reflector 1 through the front air outflow opening 8 whereas the rest the rear air outflow opening 30.

In contrast, the distribution of airflow or the amounts of air, the largest for the duct 42a whereas the smallest for the duct 42b provides weak cooling air to the semi-spherical valve (light emitting unit) of the discharge-lamp light source 3 through the duct 42b whereas strong cooling air to the inner surface of the reflector 1 through the ducts 42a and 42c. Most of the strong cooling air flow along the inner surface of the reflector 1 through the ducts 42a and 42c and collide with each other around the rear end of the semi-spherical valve.

In detail, the adjustments to the flow control plates 40a and 40b to provide stronger cooling air through the upper duct 42a than that through the lower duct 42c create airflow swirling in the opposite direction to that disclosed above.

Figure 18:
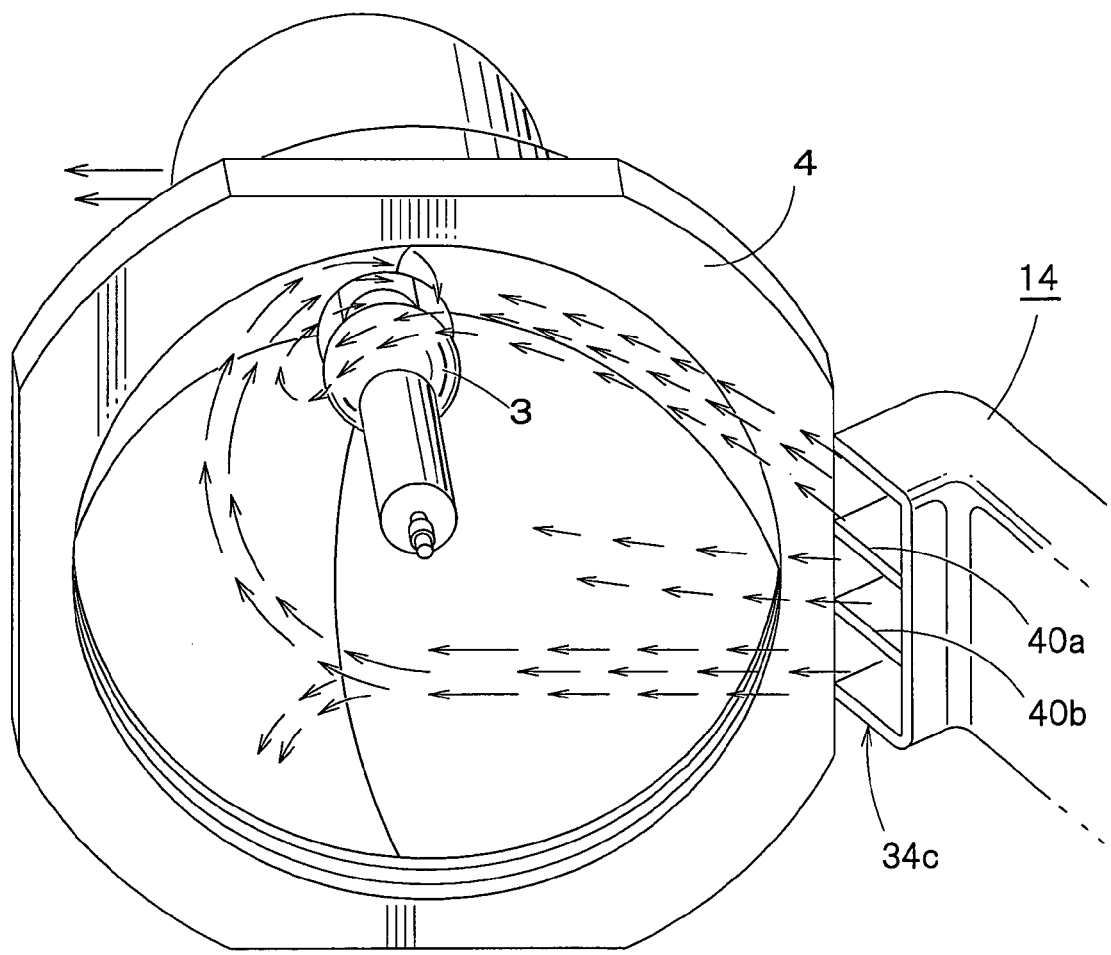
FIG. 18 is an illustration of airflow in the third modification.
Figure 19:
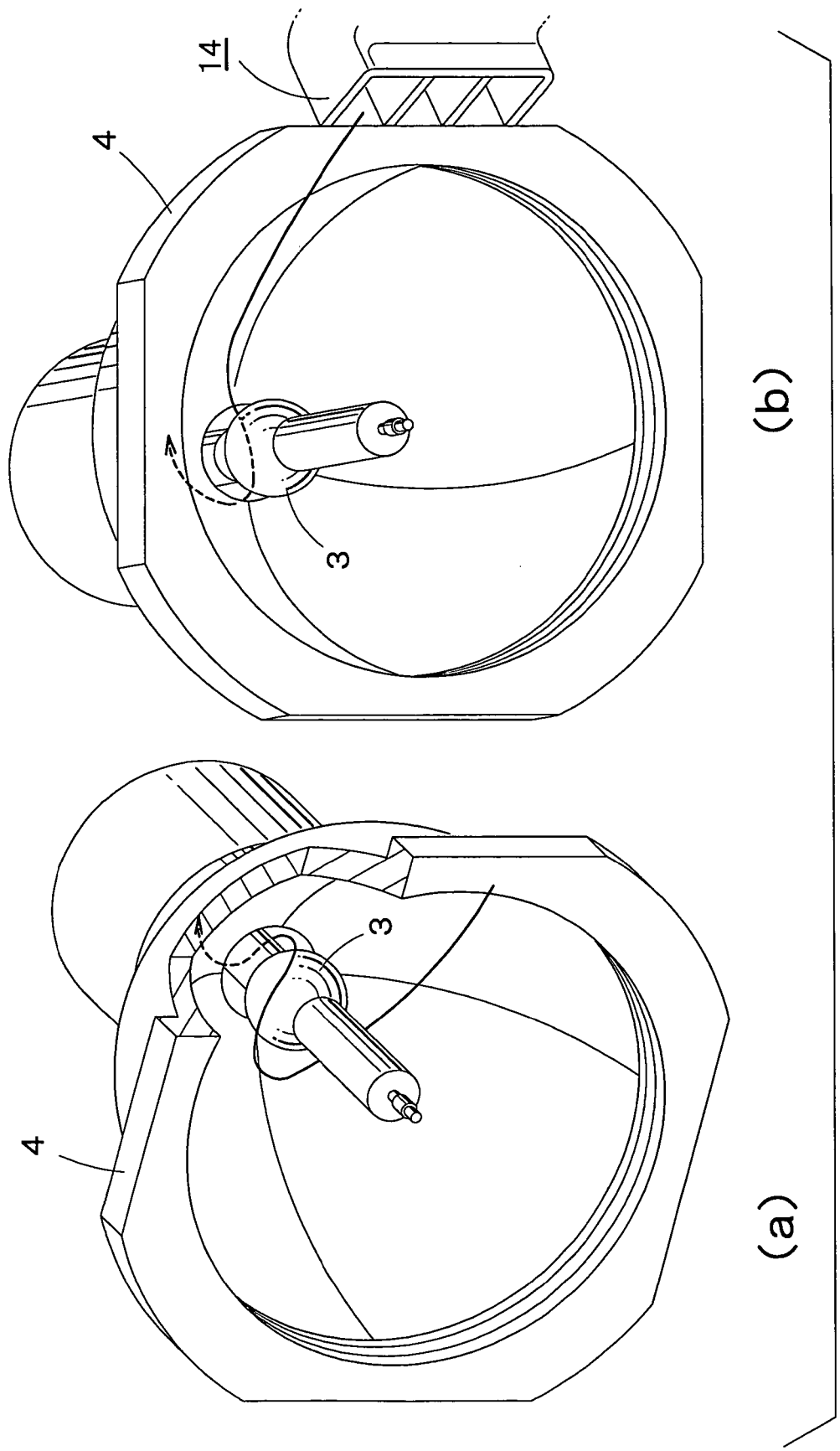
FIG. 19 is an illustration of swirling airflow in the third modification.

The opposite swirling airflow is illustrated in FIGS. 18 and 19. FIG. 18 shows a perspective view illustrating cooling airflow. FIG. 19 shows perspective views schematically illustrating part of swirling cooling airflow. In detail, illustrated in (a) of FIG. 19 is cooing airflow blown through the lower side of an air outlet of the duct 14 shown in (b) of FIG. 19. The cooling air flows under the discharge lamp light source 3 in (a) of FIG. 19. Illustrated in (b) of FIG. 19 is cooing airflow blown through the upper side of the air outlet of the duct 14. Each cooing air swirls in the clockwise direction and flows outside through the rear air outflow opening 30 (FIG. 4).

The adjustments to the flow control plates 40a and 40b to supply stronger cooling air through the upper duct 42a than that through the lower duct 42c disclosed above achieve the following cooling mechanism.

The air blown through the air inflow opening 7 intensively hits and cools the front-end electrode sealing section (cathode) of the discharge lamp light source 3. This cooling air further hits the inner surface of the reflector 1 and swirls along the inner surface thereof. Most of the cooling air is flown outside through the front air outflow opening 8 whereas the rest of the cooling air is flown outside through the rear air outflow opening 30 while cooling the rear-end electrode sealing section (anode) of the discharge lamp light source 3.

This cooling mechanism achieves intensive cooling on the electrode sealing sections at both ends of the discharge lamp light source 3 whereas weaker cooling on the center semi-spherical valve (light-emitting unit) than on the sealing sections, with spreading cooling air and swirling cooling air, both surrounding the valve.

Especially, the arrangements of the flow control plates 40a and 40b achieves precise control of cooling airflow to any specific sections of the discharge lamp light source 3.

Furthermore, control of airflow to direct weaker cooling air to the valve (light-emitting unit) of the discharge lamp light source 3 while create swirling cooling air appropriately achieves precise temperature control with less temperature difference between the upper and lower sections of the valve with no excess cooling of the valve.

This precise temperature control allows, for example, a projector equipped with the light source device of the present invention to be set upside down with less temperature imbalance. Thus, the present invention offers stable operation and higher flexibility in installation of apparatuses like projectors.

Discussed below is evaluation on the measurements of the distribution of wind velocities of cooing air flowing into the reflector 1. The measurements were conducted using the airflow analysis technique disclosed in Japanese Unexamined Patent Publication No. 2002-139511.

Figure 20:
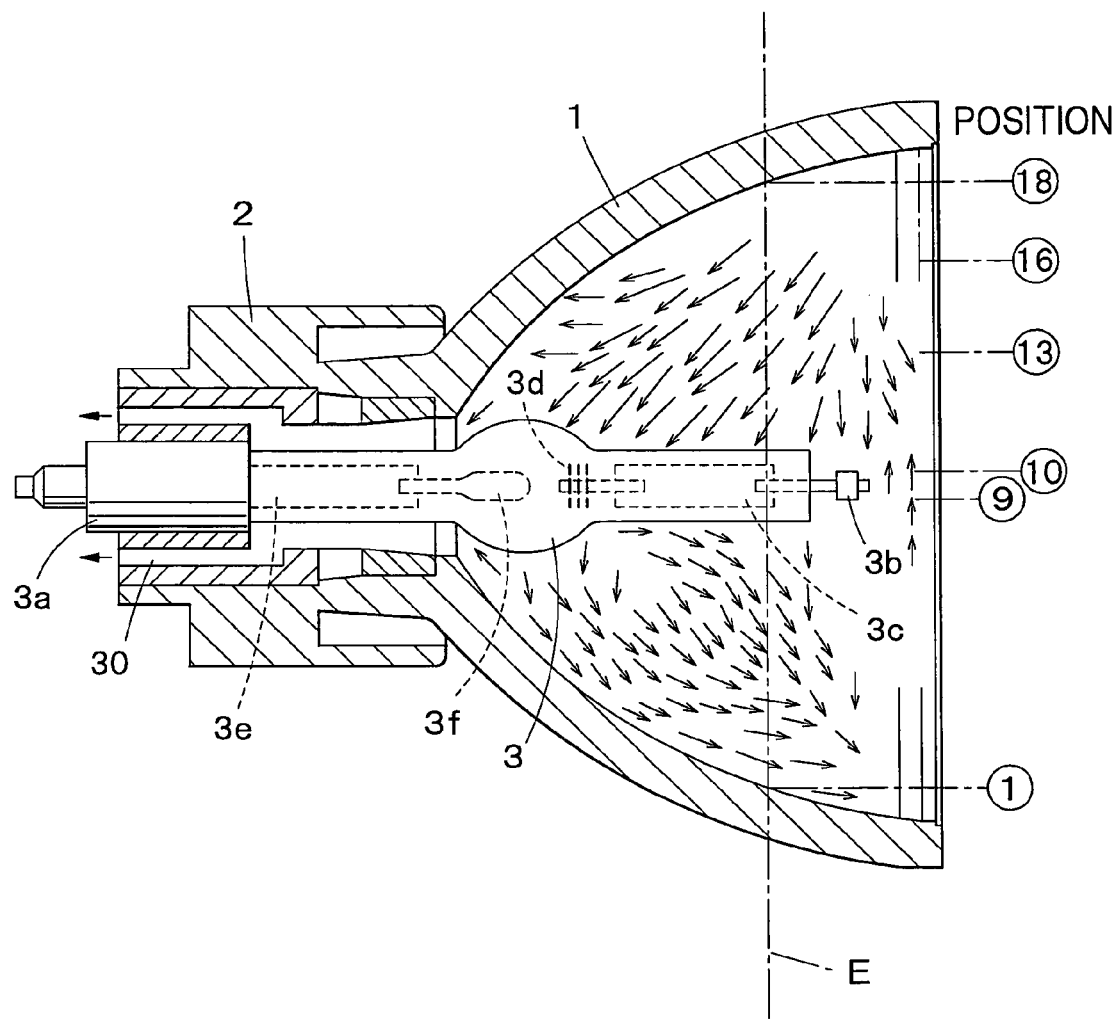
FIG. 20 is a side view illustrating the measurements of airflow on a plane E involving the optical axis in the reflector installed in the light source device according to the present invention.
Figure 21:
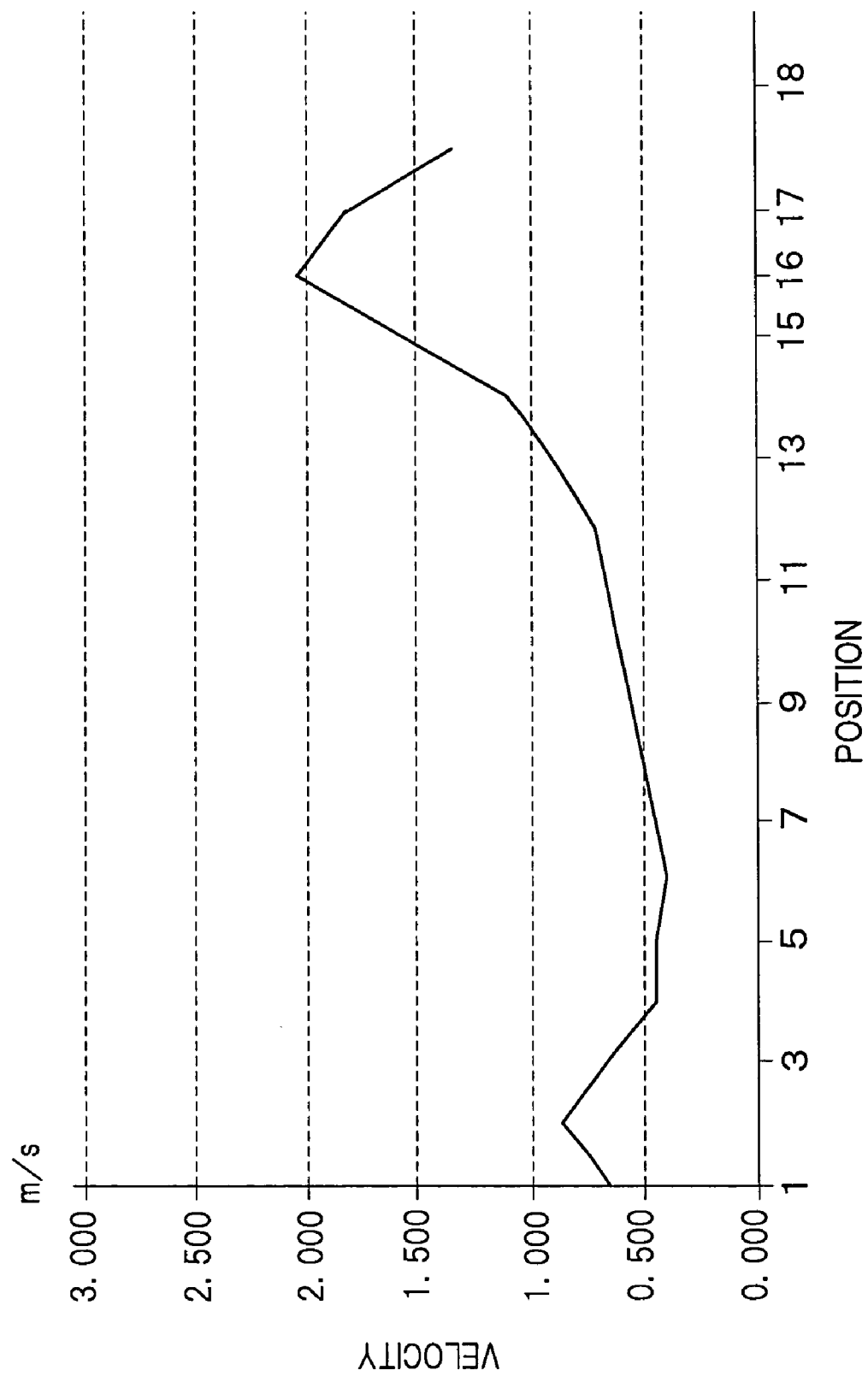
FIG. 21 is a graph indicating measured wind velocities of cooing air flown in the reflector shown in FIG. 20.

FIG. 20 is a side view illustrating the measurements of cooling airflow on a plane E involving the optical axis in the reflector 1. FIG. 21 is a graph indicating measured wind velocities of cooing air on the plane E.

The distance between positions on the axis of abscissas in FIG. 21, for example, between a position "1" and another position "3" is about 0.3 mm. A position "9" is located in the vicinity of the optical axis whereas positions "1" and "1" almost correspond to cross points between the plane E and the reflector 1, as shown in FIG. 20.

FIGS. 20 and 21 teach that air created by the sirocco fan 9, blown through the air outflow opening 13, and flown into the reflector 1 through the air inflow opening 7 via the partitions 15, 16, 17 and 18 of the duct 14 exhibits the following wind velocities.

The airflow (corresponding to a position "16" in FIG. 20) directed to the specific section (in which the molybdenum foil 3c is installed), one of the electrode sealing sections at both ends of the discharge lamp light source 3 discussed above, exhibits higher wind velocity than that flown around the specific position.

This is evident from FIG. 21 in which air is efficiently flown toward the electrode sealing sections at both ends of the discharge lamp light source 3, at a wind velocity of about 2 m/sec (on the position 16) when air is blown by the sirocco fan 9 at the speed of about 2 m/sec.

In addition, FIG. 20 teaches that airflow blown through the air inflow opening 7 to the specific section of the discharge lamp light source 3 is almost parallel to an imaginary straight line connected between the air inflow opening 7 and the specific section in the reflector 1, except in the vicinity of the air inflow opening 7 and the specific section.

As disclosed in detail, the present invention offers the light source device with precise air control to direct appropriate amount of air to any position to be cooled, thus achieving operating stability for the discharge lamp light source, which provides high light output and color reproductivity.

In the modifications to the air control unit, the flow control plate 21 or the flow control plates 40a and 40b is or are formed as extending from one side to the other in the width direction in the air control unit to completely separate the inner space of the air control unit into two or three. Not only limited to those, however, such a flow control plate can be formed as a cantilever-like plate, extending from either side but not reaching the other in the width direction in the air control unit.

What is claimed is:

1. A light source device comprising:
a concave reflector having an open front end section;
a light source having a light emitting unit, the unit being positioned on a focal point of the reflector;
a cover attached to the open front end section of the reflector to cover the open front end section, the cover having an air inflow opening provided at a side section thereof in relation to the open front end section, at least a part of the cover being made of a transparent material, the part being a light passage through which light emitted by the light source and reflected by the reflector passes;
a fan having an air outflow opening, the fan being provided so that airflow created by the fan and blown through the air outflow opening is directed to the air inflow opening of the cover, without obstructing the light passing through the light passage, a direction of the airflow blown through the air outflow opening of the fan being opposed to a direction of the light passing through the light passage; and
an air control unit provided between the air outflow opening of the fan and the air inflow opening of the cover, the air control unit controlling the airflow blown through the air outflow opening of the fan so that the airflow blown through the air outflow opening is flown into the reflector through the air inflow opening of the cover and directed at least to one specific section of the light source, thus cooling the specific section.

2. The light source device according to claim 1, wherein the light source has a first and a second sealing section sealing electrodes on both ends of the light source, the light emitting unit being interposed between the first and second sealing sections, the first sealing section being closer to the open front end section of the reflector than the second sealing section, the specific section of the light source to be cooled being the first sealing section.

3. The light source device according to claim 1, wherein the airflow blown through the air inflow opening of the cover to the specific section of the light source is almost parallel to a straight line between the air inflow opening and the specific section in the reflector, except in the vicinity of the air inflow opening and the specific section.

4. The light source device according to claim 2, wherein the reflector has an air outflow opening positioned as opposed to the open front end section of the reflector, the air outflow opening of the reflector being closer to the second sealing section of the light source than to the first sealing section, a part of the airflow directed to the specific section of the light source hitting an inner surface of the concave reflector and swirling along the inner surface, the swirling airflow cooling the second sealing section of the light source and being discharged through the air oufflow opening of the reflector.

5. The light source device according to claim 1, wherein the air control unit has at least one air control plate to provide two or more air ducts in the air control unit, the airflow created by the fan being flown into the reflector through the air outflow opening of the fan, the air ducts and the air inflow opening of the cover.

6. A light source device comprising:
a concave reflector having an open front end section;
a light source having a light emitting unit, the unit being positioned on a focal point of the reflector;
a cover attached to the open front end section of the reflector to cover the open front end section, the cover having an air inflow opening provided at a side section thereof in relation to the open front end section, at least a part of the cover being made of a transparent material, the part being a light passage through which light emitted by the light source and reflected by the reflector passes;
a fan having an air outflow opening, the fan being provided so that airflow created by the fan and blown through the air outflow opening is directed to the air inflow opening of the cover, without obstructing the light passing through the light passage; and
an air control unit provided between the air outflow opening of the fan and the air inflow opening of the cover, the air control unit having at least one control plate to provide two or more air ducts in the air control unit, the air control unit controlling the airflow blown through the air outflow opening of the fan so that the airflow blown through the air outflow opening is flown into the reflector through the air ducts and the air inflow opening of the cover and directed at least to one specific section of the light source, thus cooling the specific section, the air control plate controlling the airflow flowing through the air ducts so that the airflow directed to the specific section of the light source exhibits a higher wind velocity than airflow directed to other sections of the light source.

7. The light source device according to claim 6, wherein the light source has a first and a second sealing section sealing electrodes on both ends of the light source, the light emitting unit being interposed between the first and second sealing sections, the first sealing section being closer to the open front end section of the reflector than the second sealing section being, the specific section of the light source to be cooled by the airflow, that is controlled by the air control plate while passing through the air ducts and is directed thereto, being the first sealing section.

8. The light source device according to claim 6, wherein the air control plate controls the airflow flowing through the air ducts so that the airflow blown through the air inflow opening of the cover to the specific section of the light source is almost parallel to a straight line between the air inflow opening and the specific section in the reflector, except in the vicinity of the air inflow opening and the specific section.

9. The light source device according to claim 7, wherein the reflector has an air outflow opening positioned as opposed to the open front end section of the reflector, the air outflow opening of the reflector being closer to the second sealing section of the light source than to the first sealing section, the air control plate controlling the airflow flowing through the air ducts so that a part of the airflow directed to the specific section of the light source hits an inner surface of the concave reflector and swirls along the inner surface, the swirling airflow cooling the second sealing section of the light source and being discharged through the air outflow opening of the reflector.

10. A light source device comprising:
a concave reflector having an open front end section;
a light source having a first and a second sealing section sealing electrodes on both ends of the light source, the light source also having a light emitting unit, the unit being positioned on a focal point of the reflector between the first and second sealing sections, the first sealing section being closer to the open front end section of the reflector than the second sealing section, the specific section of the light source to be cooled being the first sealing section;

the reflector having an air outflow opening positioned as opposed to the open front end section of the reflector, the air outflow opening of the reflector being closer to the second sealing section of the light source than to the first sealing section, a part of the airflow directed to the specific section of the light source hitting an inner surface of the concave reflector and swirling along the inner surface, the swirling airflow cooling the second sealing section of the light source and being discharged through the air outflow opening of the reflector;

a cover attached to the open front end section of the reflector to cover the open front end section, the cover having an air inflow opening provided at a side section thereof in relation to the open front end section, at least a part of the cover being made of a transparent material, the part being a light passage through which light emitted by the light source and reflected by the reflector passes;

a fan having an air outflow opening, the fan being provided so that airflow created by the fan and blown through the air outflow opening is directed to the air inflow opening of the cover, without obstructing the light passing through the light passage; and an air control unit provided between the air outflow opening of the fan and the air inflow opening of the cover, the air control unit controlling the airflow blown through the air outflow opening of the fan so that the airflow blown through the air outflow opening is flown into the reflector through the air inflow opening of the cover and directed at least to one specific section of the light source, thus cooling the specific section.

11. The light source device according to claim 10, wherein the airflow blown through the air inflow opening of the cover to the specific section of the light source is almost parallel to a straight line between the air inflow opening and the specific section in the reflector, except in the vicinity of the air inflow opening and the specific section.

* * * * *

UNITED STATES PATENT AND TRADEMARK OFFICE
CERTIFICATE OF CORRECTION

PATENT NO.         : 7,210,825 B2
APPLICATION NO. : 10/736384
DATED               : May 1, 2007
INVENTOR(S)      : Hiroshi Watanabe, Noboru Fujino and Syunsaku Satoh It is certified that error appears in the above-identified patent and that said Letters Patent is hereby corrected as shown below:

Title Page item 73 should read

(73) Assignee: Victor Company of Japan, Ltd. (JP) and

Matsushita Electric Industrial Co., Ltd. (JP)

Signed and Sealed this

Fourteenth Day of July, 2009

JOHN DOLL
*Acting Director of the United States Patent and Trademark Office*